United States Patent [19]
Maldonado

[11] Patent Number: 5,992,587
[45] Date of Patent: Nov. 30, 1999

[54] MOTORCYCLE COMBINATION BRAKE ROTOR AND BELT PULLEY ASSEMBLY

[76] Inventor: Michael Maldonado, 27111 Mission Hills Dr., San Juan Capistrano, Calif. 92675

[21] Appl. No.: 08/784,844

[22] Filed: Jan. 15, 1997

[51] Int. Cl.$^6$ ...................................................... B60T 11/00
[52] U.S. Cl. ........................... 188/344; 180/219; 474/116
[58] Field of Search ................................... 188/17, 18 A, 188/26, 218 XL, 344; 180/215, 217, 219, 231; 474/116

[56] References Cited

U.S. PATENT DOCUMENTS

| | | | |
|---|---|---|---|
| 3,899,049 | 8/1975 | Martin | 188/18 A |
| 3,927,736 | 12/1975 | Bergles | 188/26 |
| 4,029,179 | 6/1977 | Butz | 188/26 X |
| 4,062,427 | 12/1977 | Klaue | 188/18 A |
| 4,541,502 | 9/1985 | Iwai et al. | 180/217 |
| 4,809,802 | 3/1989 | Seino et al. | 180/231 |
| 4,852,701 | 8/1989 | Wakatsuki | 188/181 A |

*Primary Examiner*—Robert J. Oberleitner
*Assistant Examiner*—Pamela J. Lipka
*Attorney, Agent, or Firm*—Fuess & Davidenas

[57] ABSTRACT

A motorcycle disk brake rotor in the shape of an annular ring is (i) mounted to the motorcycles rear wheel at the outside of its annulus and (ii) swept by the yoke of a disk brake caliper that is mounted to the inside of the annulus. A belt pulley affixes at its exterior circumferential region—either rigidly or "floating"—the exterior annular region of the disk brake rotor which is in the shape of the annular ring. A motorcycle disk brake caliper assembly is anchored at one mounting point to the motorcycle's rear axle shaft, and at a second mounting point to the motorcycle's suspension swingarm, engages the disk brake rotor from the inside of its annulus. The combined disk brake and belt pulley assembly is compact and visually regularly appearing. It may suitably be stylized with the same pattern as are the wheels of the motorcycle. While providing both (i) braking and (ii) motive drive functions, it is entirely located upon but one side of the motorcycle's rear wheel, making that the view of the other side of the wheel is unobstructed and aesthetically improved. It is suitably retrofitted to existing belt-drive motorcycles.

18 Claims, 4 Drawing Sheets

MOTORCYCLE COMBINATION BRAKE ROTOR AND BELT PULLEY ASSEMBLY

RELATION TO THE RELATED PATENT APPLICATIONS

The present patent application is related to U.S. patent application Ser. No. 08/783,651 filed on an even date herewith for a MOTORCYCLE COMBINATION SUSPENSION SWINGARM AND LIGHT ASSEMBLY THAT ALSO SERVING TO COVER THE AXLE NUT AND AXLE ADJUSTMENT SCREWS to the selfsame Michael Maldonado who is the inventor of the present application. The contents of the related patent application are incorporated herein by reference.

BACKGROUND OF THE INVENTION

1. Field of the Invention

The present invention generally concerns (i) motorcycle disk brakes and (ii) motorcycle belt and chain drives.

The present invention particularly concerns (i) a motorcycle disk brake rotor combined with (ii) a motorcycle belt (or chain) drive pulley, particularly so that (iii) a brake caliper engaging the disk rotor is located to the interior of the combination belt pulley and disk rotor. All elements may particularly be located to one side only of the motorcycle's rear wheel.

2. Description of the Prior Art 2.1 The Rear Wheel of a Belt Driven Motorcycle is Partially Obscured by Presence of a Drive Pulley and of a Disk Brake Each Upon Opposite Sides of the Wheel Tens of thousands of custom wheels for full-size motorcycles—such as motorcycles of the manufacture of Harley-Davidson Corporation—have been sold in the United States at prices up to $1,000 U.S. per wheel, and more, since approximately 1984. These wheels are completely finished, often in brilliant polished chrome and/or polished billet aluminum in all exposed areas. They may additionally be patterned, such as with swirls and whorls. These wheels are presently widely available in the United States from over one dozen after-market manufactures.

Nonetheless to being (i) expensive, (ii) completely finished, and (iii) patterned, the custom wheels are commonly substantially obscured when mounted, as is most common, to belt and chain drive motorcycles. Such belt-drive motorcycles include, for example, virtually all those of the manufacture of the previously-mentioned Harley-Davidson Corporation in the period since about 1984. This is because these motorcycles have both (i) a drive pulley, and (ii) a disk brake rotor located concentrically with, and proximately to, the motorcycle's rear wheel each on an opposite side of the wheel. These round objects subtend a substantial portion of the diameter, and the central area, of the wheel, thus obscuring this area from a substantial part of the field of view of the wheel from all directions substantially orthogonal to the plane of the wheel.

Overwhelmingly most commonly, the (i) drive pulley is located on one side of the wheel, and the (ii) disk brake rotor on the other side, so that the function of each should not interfere with the function of the other. Ergo, both sides of the wheel are visually obscured, at least in part. It would be aesthetically very desirable if, commensurate with maintaining the full functionality of motorcycle (i) drive and (ii) braking, the magnitude of this masking from view of the motorcycle's rear wheel could be reduced, or eliminated—at least on one side of the wheel.

In certain rare "show" motorcycles a disk brake rotor and a drive pulley have previously been located on the same side of a motorcycle's rear wheel. In these instances the drive pulley has been substantially conventional while the disk brake rotor has been made in the shape of an annulus, or annular ring. This annulus has been disposed, as will seen to be importance as regards the distinction of the present invention, to the exterior of the drive pulley.

Because the drive pulley is—commensurate with its function of transmitting drive torque to the rear wheel of the motorcycle and with the requirement that the drive belt or chain should not be bent in too tight a radius—necessarily of a reasonable diameter, the previous disk rotor in the shape of an annulus has been very large, and ungainly appearing. It has typically been some ten to fifteen inches (10"–15") or more in diameter. By this construction a one side of the rear wheel is, however, unobstructed and fully exposed to view—an advantage that will also be seen to accrue to the present invention.

2.2 Each of the Belt Pulley, the Disk Brake Rotor, and the Disk Brake Caliper(s) of a Belt-Driven Disk-Braked Motorcycle Have Distinct Characteristics The combination motorcycle belt drive pulley and disk brake rotor of the present invention will shortly be seem to "stand on its head", or "reverse", the previous orientation and relation of the (i) drive and (ii) brake parts located at the rear wheel of a motorcycle. Each of a new belt pulley component, a new disk brake rotor component, and a new disk brake caliper assembly will be seen to be different from, but roughly similarly visually appearing and functionally equivalent to, these same components and assemblies in the prior art. It is therefore worth a few sentences to consider the exact structures of these prior components.

A motorcycle belt pulley is normally affixed to the rear wheel of a motorcycle for rotation therewith, and about the rear axle shaft. The rear axle shaft is itself affixed at each of its two ends to the swing arm of the motorcycle suspension.

A conventional disk brake rotor is normally in the shape of a wide annular ring, or annulus, with a small central bore though which passes the axle. The annulus may be so wide that the disk brake rotor is sometimes not even regarded as being of this geometric form, being instead considered to be a circular plate with a central hole. This rotor is also affixed to the rear wheel of a motorcycle for rotation therewith.

Finally, the caliper of a motorcycle having disk brakes is commonly mounted to (i) the frame, or to a bracket that is in turn mounted to the frame, and (ii) the axle, of the motorcycle. The caliper has and defines a "U"-shaped yoke within which one or more pairs of pistons are opposed. Each piston moves a brake pad under force of hydraulic pressure towards a rotor that passes through, and that rotates within, the yoke. Compression on the rotor from opposed brake pads generates friction, braking the rotation of the motorcycle's wheel. The forces of the braking are ultimately transmitted to the (i) frame and (ii) axle.

SUMMARY OF THE INVENTION

The present invention contemplates a combined disk brake and belt pulley assembly for, normally, a motorcycle. The complete assembly providing both (i) braking and (ii) motive drive force transmission functions is aesthetically appealing for being both compact and visually regularly appearing. Moreover, it is entirely located upon but one side of the motorcycle's rear wheel, making that the visual view of the other side of the wheel is unobstructed and aesthetically improved.

Certain components and assemblies of the motorcycle both (i) within such a combined disk brake and belt pulley assembly, and (ii) peripherally in support of the compatible mounting and functional use of such an assembly, are different (to a greater or lessor extent) from heretofore. However, once these few components and assemblies are replaced and/or re-configured as required, then the combined disk brake and belt pulley assembly of the present invention is generally susceptible of being retrofitted to existing belt-drive and chain-drive motorcycles—particularly over one-half million belt-drive motorcycles manufactured by the Harley-Davidson Corporation since 1984 and additional thousands manufactured in Japan. Moreover, it is so retrofitted essentially by only the use of wrenches.

Namely, the present invention contemplates a disk brake for a motorcycle wherein the rotor of the disk brake is in the shape of an annular ring, or annulus, with a central hole much larger than is typical, and much larger than is required simply to pass the axle shaft. The diameter of the central hole to the annulus is generally over half (i.e., 50+%) of the overall (outside) diameter of the annulus. For lack of a better term, this disk brake rotor is called a "large hole rotor".

This "large hole rotor" in the shape of an annular ring is (i) (ultimately) mounted to the motorcycle's wheel (for rotating therewith) at the exterior circumference of the annulus, and is (ii) swept by a caliper that is mounted in the large central hole to the interior of the annulus. The "large hole rotor" of the disk brake is thus both (i) mounted and (ii) swept diametrically oppositely to a conventional disk brake rotor that is affixed to the wheel at its interior annular region, and that is swept by a caliper at its exterior annular region.

The present invention further contemplates a new motorcycle belt pulley. The side surface of the new belt pulley conventionally affixes the wheel for rotation therewith. However, the new belt pulley affixes at its exterior circumferential region—either rigidly or "floating"—the exterior annular region of the "large hole rotor" that is in the shape of an annular ring.

This affixation of the "large hole rotor" is without interference to the belt (or chain) drive occurring at the exterior circumference of the belt pulley. Moreover, it is normally upon an opposite side of the belt (or chain) pulley to the side where the pulley affixes the wheel. (A conventional belt or chain pulley does not, of course, affix anything at its exterior circumferential region.)

The present invention still further contemplates a new motorcycle disk brake caliper assembly. This assembly is anchored at one mounting point to the motorcycle's rear axle shaft, and at a second mounting point indirectly to the motorcycle's frame, normally and preferably through the motorcycle's suspension swingarm. In this position the yoke of the new caliper assembly extends over, and operates to compress, the inner annular region of the "large hole rotor" in the shape of an annular ring. Accordingly, the new caliper assembly is mounted differently than heretofore. Moreover, it is differently disposed and oriented than heretofore, having the opening of its yoke oriented radially outward to engage the "large hole rotor" from the inside of the rotor's annulus as opposed to the normal engagement of a conventional rotor from the outside of the rotor's annulus.

1. A Motorcycle Combined Disk Brake Rotor and Belt Pulley

In one of its aspects, the present invention is embodied in an assembly for a vehicle, typically a motorcycle, that has a rear wheel rotating on an axle in response to a belt or chain drive.

The assembly includes a belt (or chain) pulley secured to the rear wheel in position about the axle. This belt (or chain) pulley is in the shape of a round plate having at its circular periphery a flange transversely extending substantially only to one side of the plate. Ergo the belt pulley is roughly in the overall shape of a shallow bowl.

The external circumferential surface to the flange engages and couples the drive belt (or chain) so as rotate the wheel upon the axle. Namely, this external circumferential surface typically presents, in the case of a belt pulley, parallel striations, or grooves, that engage the teeth of a toothed drive belt. Similarly, the external circumferential surface of a chain pulley normally presents sprockets. This much is conventional. A volume of the belt pulley defined within its peripheral flange, meaning the interior of the shallow bowl, is at least partially void.

A disk brake rotor in the shape of an annular ring (with a large central hole) is affixed at the exterior circumference of its annulus secured to the peripheral flange of the belt pulley. Accordingly, the brake rotor is induced to rotation with the belt pulley to which it is affixed, and with the rear wheel to which the belt pulley is in turn affixed, by a mechanical connection. Notably, this mechanical connection proceeds not from the interior—as is typical—but rather from the exterior of the annulus of the annular disk brake rotor.

A disk brake caliper is mounted so as to engage and squeeze the rotating disk brake rotor within its "U"-shaped yoke. So mounted, the disk brake caliper is at least partially located within the vacant volume of the belt pulley. The cylinders and pads of the brake caliper engage the interior region of the annulus of the "large hole rotor"—opposite to what is conventional.

Clearly this disk brake caliper—located so as to engage and couple braking force to the rotating disk caliper—must be affixed somewhere, somehow, between (i) the frame and (ii) the axle of the motorcycle in order that it should accord a braking action. The disk brake caliper is preferably so affixed at two points. The combined affixation permits the disk brake caliper to move slightly, as is conventional, for purposes of alignment relative to the (rotating) brake rotor.

A first affixation point is to the swingarm of the motorcycle's rear suspension. This affixation point may be made directly to ears or tabs or other form of mechanical anchor located directly on the swingarm. For example, the swingarm may present a channel or female receptacle while the caliper presents a tab, or male member, that fits within the channel. This affixation permits the ready coupling of strong forces (resulting from braking) nonetheless to permitting the slight transverse movement that the disk bake caliper requires to center itself on the rotating rotor. Alternatively, this first connection, may be indirect to the swingarm via a small and inconspicuous (but adequately strong) bolted strut that connects to the swingarm of the motorcycle's rear suspension.

A second, opposite, affixation point is to the axle. This second affixation is normally in the form of a simple hole, or bore, in which fits the axle.

By this construction the combined belt pulley and brake rotor is very compact. Moreover, the disk brake caliper is located to the interior of the annulus of a "large hole" rotor, making that it also is compact.

Still further, the (i) combined belt pulley and brake rotor in conjunction with (ii) the disk brake caliper is substantially uniformly circular and regular in its external contours and appearance. Consider that the disk brake caliper is partially "hidden" within the shallow belt pulley, and by the "large hole" annulus of the disk rotor. Some think that the entire assembly looks aesthetically superior to a conventional motorcycle drive pulley and disk brake.

Importantly, the present invention permits that both the (i) disk brake and (ii) drive pulley elements of a motorcycle are located upon the same side of the motorcycle's rear wheel. The other side of the motorcycle's rear wheel is mechanically unencumbered and visually unobscured, immediately producing an unobstructed view of the entire diameter of the wheel which many motorcycle aficionados find visually striking and appealing.

2. A Motorcycle Belt Pulley Affixing at Its Exterior Circumferential Region the Exterior Annular Region of a Disk Brake Rotor In another of its aspects, the present invention is embodied in a belt pulley for, typically, a motorcycle having a rear wheel rotating on an axle in response to a belt or chain drive, and having a rear disk brake including a caliper.

The preferred belt pulley has a body in the shape of a thick annular ring with a peripheral flange extending transversely substantially to one side of the annular ring. The axle passes through the central aperture of the annulus while the drive belt or chain engages the outer surface of the peripheral flange.

A first mounting mechanism, normally circularly arrayed holes that serve to fit bolts, acts to affix the rear wheel to the body's thick annular ring with the pulley's body's flange extending oppositely to the wheel. By this mounting, rotation of the pulley's body by the drive belt or chain also serves to co-rotate the wheel.

A second mounting mechanism is located near the rim of the pulley's body in a position where it does not interfere with the engagement of the drive belt by the outer surface of the body's peripheral flange. A second mounting mechanism, again typically circularly arrayed holes and bolts, serves to affix the body at, and to, a disk brake rotor that is also in the shape of an annulus, this time with a large central hole. However, this second mounting mechanism of the belt pulley's body can affix the disk rotor in several ways particular to the present invention.

The belt pulley's second mounting mechanism affixes a circumferentially peripheral portion (i.e., not a central portion) of an annular disk brake rotor. A remaining portion of the rotor extends substantially spaced parallel to thick annular ring of the belt pulley's body. Some small thought will reveal that if the belt pulley's second mounting mechanism is to so affix a circumferentially peripheral portion of the annular rotor, then a remaining (non-peripheral) portion of the annular rotor must be extending inward towards the axle. This is indeed the case, providing a motorcycle belt pulley and brake rotor that is, in combination, novel.

The second mounting mechanism may be either (i) solid or (ii) floating. A preferred solid mounting of the belt pulley's body to the disk brake rotor is realized by bolts seating in threaded holes or by nuts and bolts. The "floating" mounting is more sophisticated, but totally analogous to the manner in which disk brake rotors have occasionally heretofore been mounted, only now the "floating" mounting transpires from the exterior of the annulus of the brake rotor as opposed to the interior of the annulus. The past and present purpose of a "floating" mounting is so as to account for a slight movement of the rotating brake rotor cross-wise, and transversely to (i.e., perpendicular to the tangential vector of rotation), the brake caliper.

3. A Motorcycle Disk Brake Rotor Affixed at its Outer, and Swept at its Inner, Annular Regions In yet another of its aspects, the present invention is embodied in a disk brake rotor, typically but not necessarily for use on a motorcycle, in the shape of an annulus that is (i) affixed at its outer, and (ii) swept at its inner, annular regions. Such a disk brake rotor will be recognized to be the direct opposite of a conventional disk brake rotor, which is (i) affixed at its inner, and (ii) swept at its outer, annular regions.

A preferred disk brake rotor for a motorcycle or other vehicle so constructed has a body in the shape of an annular ring with a large central hole. A peripheral region of the annulus has and presents features that are suitable to stably engage and to affix an external structure. Namely, this is where the disk brake rotor is affixed and held. Meanwhile, an interior region to the annulus is suitably spanned, and swept during the rotation of the body, by the caliper of a disk brake. Clearly this inner annular region is unobstructed.

Accordingly, such a disk brake rotor in accordance with the present invention is distinguished in that its annular body is engaged and affixed at its peripheral region, and is swept at its interior region.

The disk brake rotor's annular body's peripheral region's engagement and affixation features are preferably in the form of circularly arrayed bolt holes that are placed in, and defined by, the body at its annular peripheral region, normally by process of machining. Bolts are passed through these holes to affix the "large hole" disk brake rotor to, preferably, a belt or chain pulley. Notably, however, the new disk brake rotor need not be so affixed. It can be, for example, affixed directly to the interior of a wheel—presenting options for combined disk brake rotors and vehicle wheels that are beyond the scope of the present disclosure.

4. A Motorcycle Disk Brake Caliper Assembly That Is Rotationally Anchored Between the Motorcycle's Shaft and Suspension Swingarms so as to Sweep a Rotating Annular Disk Brake Rotor From the Interior of the Annulus Similarly to the fact that a ("large hole" annular) disk brake rotor of the system of the present invention is unique relative to prior rotors, the caliper assembly used with the system is also unique, and is, arguably, even more strange.

As is conventional, the caliper assembly is mounted—perhaps not rigidly (i.e., "floating") but certainly so that it will not undergo rotation with the wheel nor with the disk brake caliper co-rotating with the wheel—to the frame of the motorcycle. As is also conventional, the rotor of the disk brake rotates within the yoke of the caliper assembly. By the well-know principles of disk brakes, the pistons, and brake pads, of the caliper assembly are compressed by hydraulic or mechanical force against the rotating rotor, exerting frictional forces on the rotor relative to the frame and braking the motorcycle.

The caliper assembly use with the system of the present invention has a "two-point" mounting. One of these mountings is, to the best knowledge of the inventor, unique. The caliper assembly has and presents at one "end" portion of its body a bore through which passes the (stationary) shaft of the motorcycle's rear wheel. (This bore may optionally mount a sleeve or a bearing for a tight precision fit, but since there is no rotation this is not required.) The other, remaining, mounting point is also uncommon. It is preferably to the swingarm of the rear wheel suspension of the motorcycle. A caliper assembly so mounted, and passing the (rotating) disk brake rotor through its yoke, is functionally totally effective.

The caliper assembly has yet further, and arguably more subtle, differences from any previous caliper assembly of the inventor's knowledge. When two or more opposed (hydraulic) cylinder pairs are used, as is common, then these cylinder pairs are each arrayed at a substantially equal radial distance from the shaft (which is at the center of the rotating disk). This location is also common. However, and quite uncommonly, the cylinders are so arrayed from a caliper body that is located inside the annulus of a "large hole" annular rotor disk, as opposed to being located outside the annulus of "small hole", almost circular, rotor disk! The cylinders are thus "splayed" outward from the body of the caliper assembly towards the "large hole" annular rotor disk, instead of and oppositely to being "directed" inward from the body of a caliper assembly towards the "small hole" rotor disk as is conventional.

The caliper assembly of the present invention is small, compact, and similarly-appearing to previous caliper assemblies. However, upon close inspection and study, it will hereinafter be recognized that many of the geometries of (i) mounting, and (ii) cylinder position, have changed.

These and other aspects and attributes of the present invention will become increasingly clear upon reference to the following drawings and accompanying specification.

BRIEF DESCRIPTION OF THE DRAWINGS

FIG. 2a is a detail side plan view.

FIG. 3a is a detail side plan view.

FIG. 5a is a detail side plan view.

DESCRIPTION OF THE PREFERRED EMBODIMENT

Figure 1:
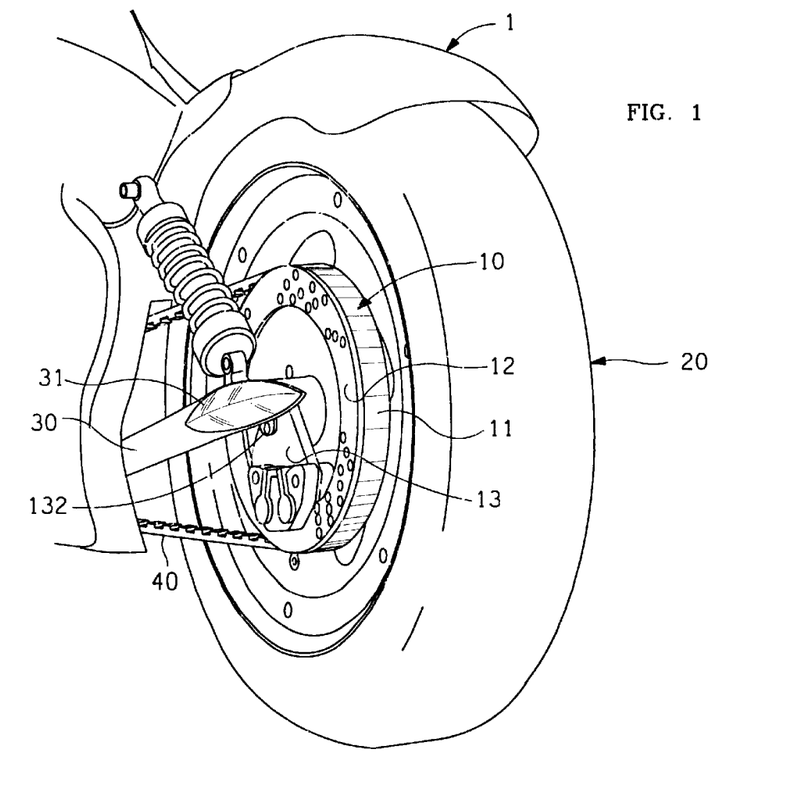
FIG. 1 is a diagrammatic perspective view showing a rear end of a belt-drive disk-braked motorcycle equipped with the combination brake rotor and belt pulley assembly of the present invention.

A diagrammatic perspective view of the rear end of a belt-drive disk-braked motorcycle 1 equipped with the combination disk brake rotor and belt pulley assembly 10 of the present invention is shown in FIG. 1. A rear wheel 20 is rotationally supported upon a rear axle shaft 21 (shown in FIG. 2a) that is connected between terminus points on each of the two arms of the swingarm 30. In accordance with the related invention, the axle nuts, and the axle adjusting screw, are hidden beneath a removable lens 31 at the end of each arm of the swingarm 30.

It will be understood that the combination disk brake rotor and belt pulley assembly 10 is fitted to that side of the motorcycle where exists the belt or chain drive, illustrated by way of example as belt drive 40. The other side of the rear wheel 20 is typically completely devoid of any (i) belt drive, and/or (ii) brake rotor, and is correspondingly unobstructed to view, and to that extent aesthetically improved.

The entire disk brake rotor and belt pulley assembly 10 is affixed to, and rotates with, the wheel 20. The disk brake rotor and belt pulley assembly 10 includes in particular the belt pulley 11, which is in the substantial shape of a large shallow round bowl, that is first-affixed to the wheel 20. The belt pulley 11 has an array of interior bolt holes 111, as will be most clearly shown in FIGS. 2a and 3a, by which it is bolted to the wheel 20. The disk brake rotor 12 is, as will shortly be seen, affixed in turn to the belt pulley 11 by bolts 121.

The combined disk brake rotor and belt pulley assembly 10 is, in the manner of a Large shallow bowl with a very wide inwardly-directed lip to its upper aperture, substantially hollow to its interior. This is the region where operates the disk brake caliper assembly 13. This caliper assembly 13 has a unique mounting, as well as an new alignment of its cylinders and pads that is different from previously. As may be viewed in FIG. 1, and is further shown in FIG. 2, a first mounting region, or point, in the form of a bore 131 of the disk brake caliper 13 fits around the axle shaft 21. This bore 131 may be equipped with a precision sleeve or bearing (not shown) at this point, but this is normally not necessary because nothing is rotating at this point of affixation. Indeed, the caliper assembly 13 is preferably somewhat loose to the shaft 21 for reasons, momentarily to be explained, that it may be "floating".

Meanwhile, the remaining, second, mounting region, or point, 132 of the disk brake caliper 13 is connected to a same-side adjacent arm of the swingarm 30. This region of attachment normally extends for a few inches in length. It is hard to see in FIG. 1, being somewhat obscured by the swingarm 30. Suffice it only to say that the disk brake caliper 13 does not "hang" by its first (bore) mounting at the axle 21, and is ultimately affixed to the frame of the motorcycle 1. This second mounting of the brake caliper 13 at and to the swingarm can be in the form of interlocking mechanical features (shown in part at 132) located upon each of (i) the outside of the brake caliper 13 at its second mounting region 132 and (ii) the inside of the associated arm of the swingarm 30. These features may be rigidly interlocking or, as is preferred, interlocking with some "play".

By this preferred "loose" attachment at both of its mounting regions, the disk brake caliper assembly 13 is "floating" with some ability to "float with", or to "track" the disk brake rotor 12 and the motorcycle wheel 20 to which such disk brake rotor 12 is ultimately attached. Notice that the dimensional tolerance that is being discussed here is not the normal "full-floating" action of the pads of a disk brake caliper, especially one that is free (as is the preferred case here) to move slightly in a direction perpendicular to the plane of the wheel. Instead, the disk brake caliper when loosely affixed will very slightly rotate, or tilt, in the plane of the disk brake rotor 12, which plane is parallel to the plane of the wheel 20. This slight tilt, or play, could arguably delay the transmission of forces between the frame of the motorcycle 1 and the disk brake rotor 12 for some milliseconds (as is determined by how fast the tangential velocity of the disk brake rotor 12 forces the disk caliper assembly 13 "against the stops"). It might also be suspected that some "clack", or even "chatter" could ensue.

In fact, the somewhat loosely mounted caliper assembly 13 gives no detectable problems while producing an extremely smooth, vibrationless, braking action. It should further be understood that the tightness of the (two-point) mounting of the brake caliper assembly 13 is always, and in any case, under the control of, and to the tastes of, the owner-operator of the motorcycle 1. To tighten the first mounting at bore 131 a sleeve may be used. To tighten the second mounting at region 132 a wedge is normally driven between the complimentary, interlocking, attachment features upon the brake caliper 13 and swing arm 30.

The combination disk brake rotor and belt pulley assembly 10 of the present invention is preferably made from ferrous metal or aluminum, which metals may be surface treated, including by plating including with chrome, as desired. The materials of manufacture may in particular be those metals currently used in brake rotors: (i) stainless steel, (ii) high carbon content stainless steel, (iii) carbon fiber enhanced metal, including steels, (iv) cast iron, (v) ductile iron, (vi) tempered steel (at varying degrees of temper), (viii) aluminum alloy, and (ix) aluminum ceramic. These materials are all stamped or laser cut to shape.

The disk brake rotor 12 is typically Blanchard ground to ensure a high degree of flatness. The sprockets, or teeth, of the belt pulley 11 are typically made in any of three ways: 1) The teeth can be attached by broaching. 2) The teeth can be milled. 3) The teeth can be cut in the process of Electric Discharge Machining, or E.D.M.

Figure 2A:
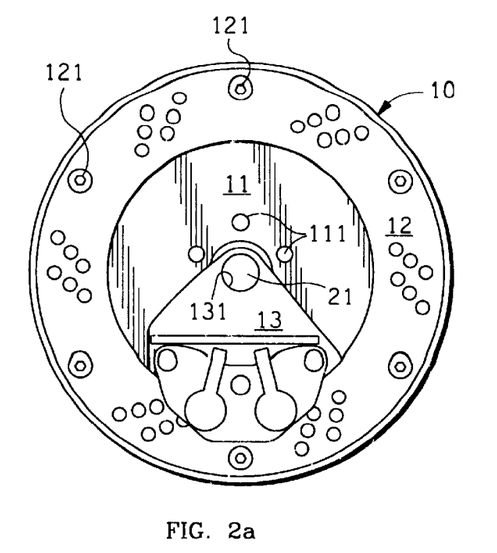
Figure 2B:
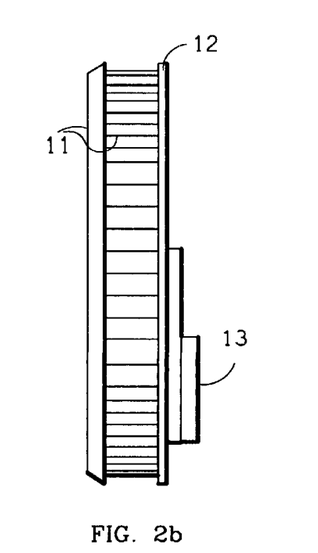
FIG. 2b is a detail end plan view, of a preferred embodiment of the combination brake rotor and belt pulley assembly of the present invention.
Figure 3A:
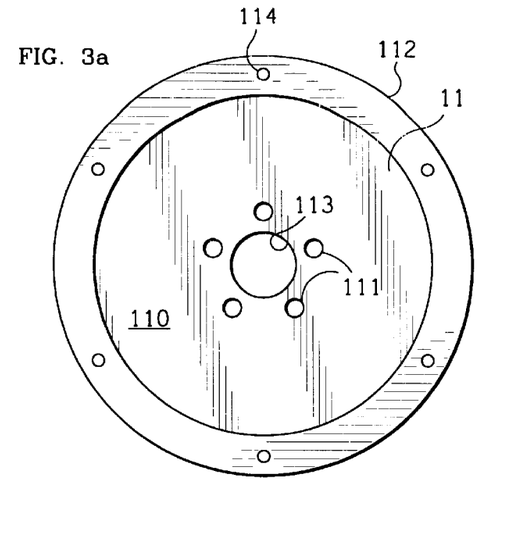
Figure 3B:
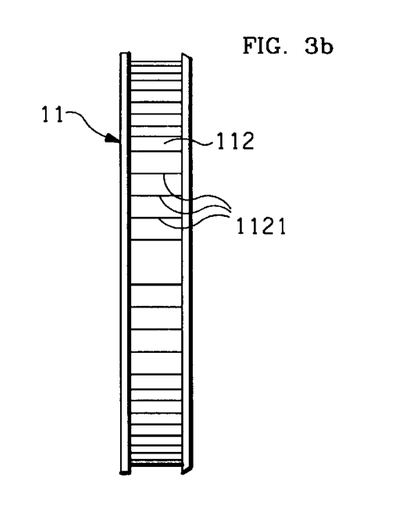
FIG. 3b is a detail end plan view, of the belt pulley (only) of the preferred embodiment of the combination brake rotor and belt pulley assembly of the present invention.
Figure 4A:
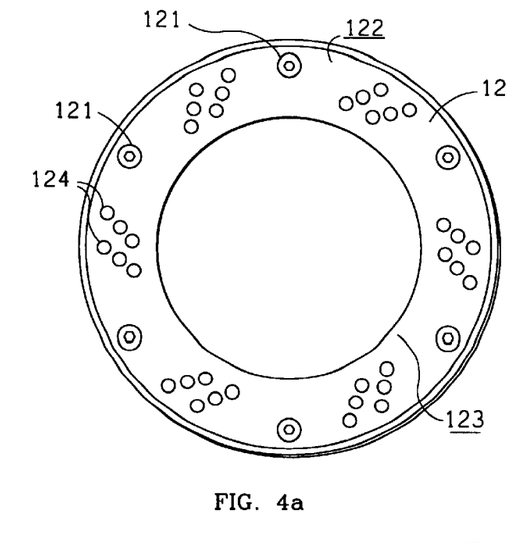
FIG. 4a is a detail side plan view of the belt pulley assembly of FIG. 3 in combination with a rotor so as to, in combination, constitute the preferred embodiment of the combination brake rotor and belt pulley assembly of the present invention.
Figure 4B:
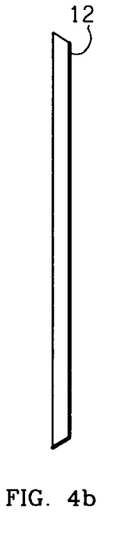
FIG. 4b is a detail end plan view of the rotor (only) of the preferred embodiment of the combination brake rotor and belt pulley assembly of the present invention.
Figure 4C:
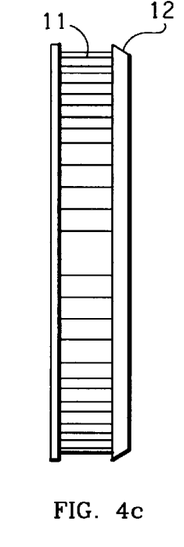
FIG. 4c is a detail end plan view of preferred embodiment of the complete combination brake rotor and belt pulley assembly of the present invention.

Continuing with the explanation of the structure of the present invention, a preferred embodiment of the combination brake rotor and belt pulley assembly 10 of the present invention is shown in detail side plan view in FIG. 2a, and in detail end plan view in FIG. 2b. A detail side plan view of the belt pulley 11, only, is shown in FIG. 3a, and a detail end plan view for the same belt pulley 11, only, is shown in FIG. 3b. Likewise, a detail side plan view of the disk brake rotor 12, only, is shown in FIG. 4a. The detail end plan view of the same rotor 12, only, is shown in FIG. 4b. However, the end plan view of FIG. 4c again shows the belt pulley 11 and disk brake rotor 12 in combination. Finally, detail side, and end, plan views of a preferred embodiment of the caliper assembly 13 are respectively shown in FIGS. 5a and 5b, with a side view of a caliper pad being shown in FIG. 5c.

The entire combination belt pulley and disk brake rotor 10 is for use on a motorcycle 1 or other vehicle having (i) a frame, (ii) a chain or belt drive 40, (iii) a wheel 20 rotating on an axle 21 in response to the belt (or chain) drive 40, and (iv) a disk brake caliper 13.

In this combination the belt pulley 11 has a circular plate region 110 that is suitably affixed to the wheel 20 in position about the axle 21 for rotation concentrically therewith. The belt pulley 11 also has a transversely-extending peripheral flange region 112. This flange region 112 has a circumferential exterior surface suitably contoured with features 1121 so as to engage the drive belt 40 or, alternatively, chain. In the figures the exterior surface of the flange regions 112 surface is illustrated to have features 1121 of the order of striations, or grooves, or teeth suitable to engage the toothed drive belt 40 shown in FIG. 1. The surface 112 may alternatively present features 1121 in the form of sprockets (not shown) suitable to engage and to couple drive force from a chain. The plate region 110 and the transversely-extending flange regions 112 cooperate in order that the wheel 20 affixed to the belt pulley 11 is rotated upon and about the axle 21 under force of the drive belt 40 (or an equivalent chain).

The plate region 110 of the belt pulley 11 presents (i) a central aperture 113 with (ii) circularly-arrayed holes 111 located about this central aperture 113. The belt pulley 11 is affixed to the wheel 20 by bolts (not shown) that pass though these circularly-arrayed holes 111 so as to engage the wheel 20. Meanwhile, the axle 21 about which the wheel 20 and its affixed belt pulley 11 rotate passes through the central aperture 113 of the belt pulley 11.

The transversely-extending peripheral flange region 112 of the belt pulley 11 has transversely-extending circularly-arrayed holes 114 (interior to its exterior surface with its features 1121). Affixation of the exterior circumference of the annulus of the disk brake rotor 12 to the peripheral flange region 112 of the belt pulley 11 is by bolts (not shown) that pass though these circularly-arrayed transversely-extending holes 114.

Clearly a volume of the belt pulley 11 within its peripheral flange region 112 is at least partially empty. After the disk brake rotor is affixed (by bolts within the holes 114), the disk brake caliper 13 (shown in FIG. 2) that is mounted between the axle and the swingarm is held so that it is at least partially located within the vacant volume of the belt pulley 11, where it serves to engage the disk brake rotor 12.

The disk brake rotor 12 has a body in the shape of an annular ring. An exterior circumferential region 122 of the annulus is affixed to the peripheral flange region 112 of the belt pulley 11 by appropriate mechanical connection features. Holes 121 that accept bolts (not shown) are preferred. An interior region 123 to the annulus of the disk rotor 12 is suitably spanned, and is swept during the rotation of the body of the disk rotor 12, by a yoke 133 of the disk brake caliper 13. The disk brake rotor 12 preferably has vent holes 124 for improved cooling.

The disk brake rotor 12 is distinguished in that its annular body is engaged and affixed at its peripheral exterior circumferential region 122, and is swept at its interior annular region 123.

Figure 5A:
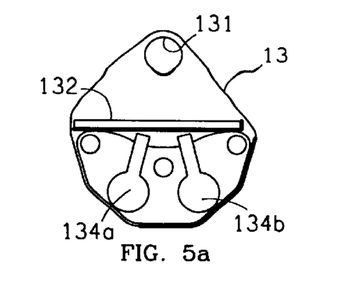
Figure 5B:
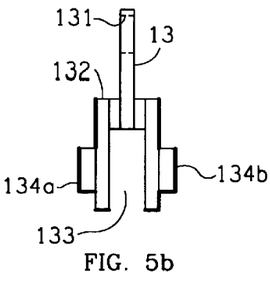
FIG. 5b is a detail end plan view, of a preferred embodiment of the caliper assembly used with the preferred embodiment of the combination brake rotor and belt pulley assembly of the present invention.
Figure 5C:
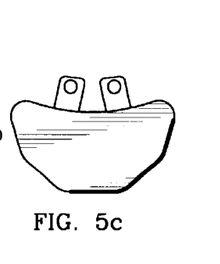
FIG. 5c is a detail side plan view of a disk brake pad used with the preferred embodiment of the caliper assembly used with the preferred embodiment of the combination brake rotor and belt pulley assembly of the present invention.

A preferred disk brake caliper assembly 13, particularly for a motorcycle, is shown in FIGS. 5a and 5b. The caliper assembly is usable on any vehicle having (i) a rear wheel (such as wheel 20 (shown in FIG. 1) rotating on, e.g., (ii) a shaft 21, (iii) a frame, and (iv) a disk rotor 12 in the shape of an annular ring affixed to the wheel 20 for rotating therewith. The caliper assembly 13 has a body that has and defines (i) at one end portion a bore 131 through which passes the shaft 21, and (ii) at another end portion a feature 132 that attaches the suspension swingarm 30. The interior region 123 of the rotating annular ring of the disk rotor 12 passes through the "U", or "Y", -shaped yoke 133 of the caliper assembly 13.

A number of opposed cylinder pairs 134a, 134b are arrayed within the yoke 133 of the caliper 134 each at substantially equal radial distance from the bore 131 and the shaft 21. The cylinders pairs 134a, 134b are arrayed in an arc with the bore 131 and the shaft 21 at the substantial focus of the arc.

Figure 6:
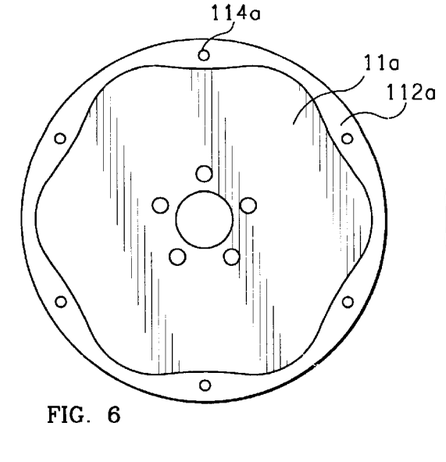
FIG. 6 is a detail side plan view of a first variant of the belt pulley of the combination brake rotor and belt pulley assembly of the present invention.

A detail side plan view of a first variant belt pulley 11a of the combination brake rotor and belt pulley assembly 10 of the present invention is shown in FIG. 6. In this variant belt pulley 11a the exterior peripheral circumferential flange region 112a is escalloped in contour, presenting more strength around the region of bolt holes 114a.

Figure 7:
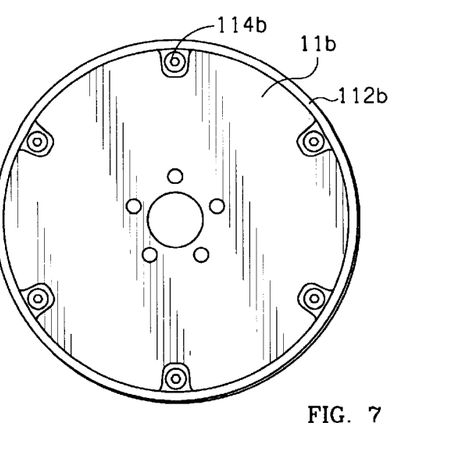
FIG. 7 is a detail side plan view of a second variant of the belt pulley of the combination brake rotor and belt pulley assembly of the present invention.

A detail side plan view of a second variant belt pulley 11b of the combination brake rotor and belt pulley assembly 10 of the present invention is shown in FIG. 7. In this variant belt pulley 11b the exterior peripheral circumferential flange region 112b is even more substantially relieved and lightened, presenting metal substantially only around the region of bolt holes 114b.

Figure 8:
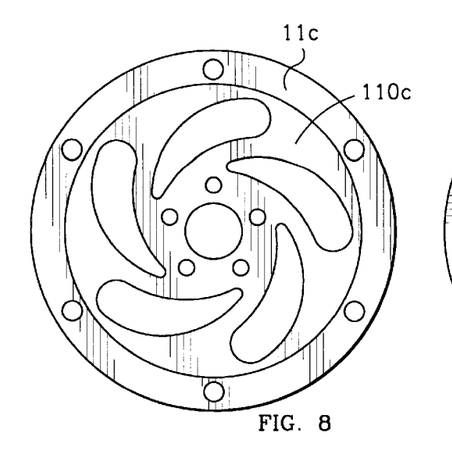
FIG. 8 is a detail side plan view of a third variant of the belt pulley of the combination brake rotor and belt pulley assembly of the present invention.

A detail side plan view of a third variant belt pulley 11c of the combination brake rotor and belt pulley assembly 10 of the present invention is shown in FIG. 8. The third variant belt pulley 11c has patterned apertures in its plate region 110c, primarily for stylistic reasons although metal and weight are also conserved.

Figure 9:
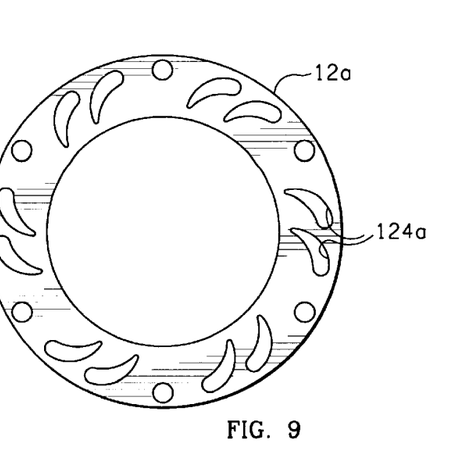
FIG. 9 is a detail side plan view of a first variant of the rotor of the brake rotor of the combination brake rotor and belt pulley assembly of the present invention.

A detail side plan view of a first variant rotor 12a of the combination brake rotor and belt pulley assembly 10 of the present invention is shown in FIG. 9. The first variant rotor 12a has vent holes 124 patterned in other than circular holes for stylistic reasons.

Figure 10:
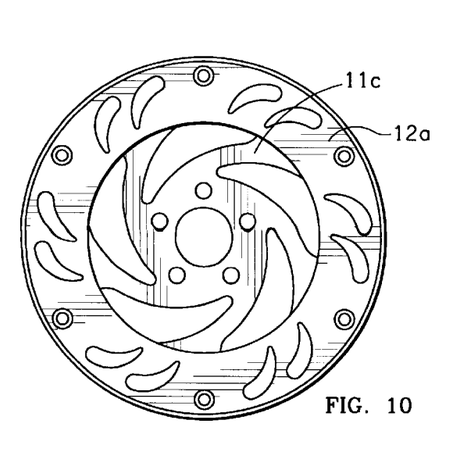
FIG. 10 is a detail side plan view of a third variant of the belt pulley previously seen in FIG. 8 combined with the first variant of the brake rotor previously seen in FIG. 9 to produce a "high-styled" variant of the combination brake rotor and belt pulley assembly of the present invention.

A detail side plan view of a third variant belt pulley 11c combined with the first variant brake rotor 12a to produce a "high-styled" variant of the combination brake rotor and belt pulley assembly 10 of the present invention is shown in FIG. 10.

Figure 11:
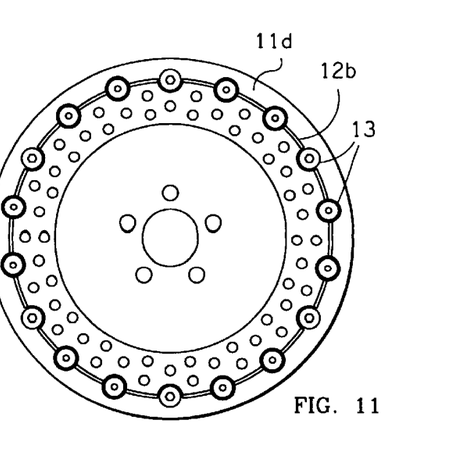
FIG. 11 is a detail side plan view of a second variant rotor, and a fourth variant belt pulley, assembled into a "full-floating disk rotor" variant of the combination brake rotor and belt pulley assembly of the present invention.

FIG. 11 is a detail side plan view of a second variant rotor 12b, and a fourth variant belt pulley 11d, assembled into a "full-floating disk rotor" variant of the combination brake rotor and belt pulley assembly 10 of the present invention. The combined variant embodiment is characterized in that the rotor 12 is locked to the belt pulley 11d, and vice-versa, but is not so tightly locked. Instead, a typically numerous array of mechanical features, preferably arrayed bolts 14 fitting into complimentary recessed holes, hold the rotor 12 locked to the belt pulley 11d in alignment in a single plane, but with some slight rotational tolerance, or "slack", between them. By this construction the coupling of the brake rotor 12a, and the mechanical forces exerted thereon during braking, is with such a slight hesitation as is regarded by some as a beneficial smoothness. Moreover, eccentricity in the rotation of the rotor 12b relative to the wheel 20 is arguably better tolerated as regards grabbing, or "chattering", of the cylinder pairs 134a, 134b of the disk brake caliper 13.

A detail side plan view of a fifth variant "belt" pulley 11d is shown in FIG. 11. The fifth variant "belt" pulley 11d has sprocket teeth 115d suitable to engage a drive chain (not shown), and is actually a chain pulley 11d. The fifth variant "belt" (chain) pulley 11d is shown combined with a disk rotor, nominally the first variant disk rotor 12, in order to make a combination brake rotor and "belt" pulley assembly of the present invention.

Figures 12, 13:
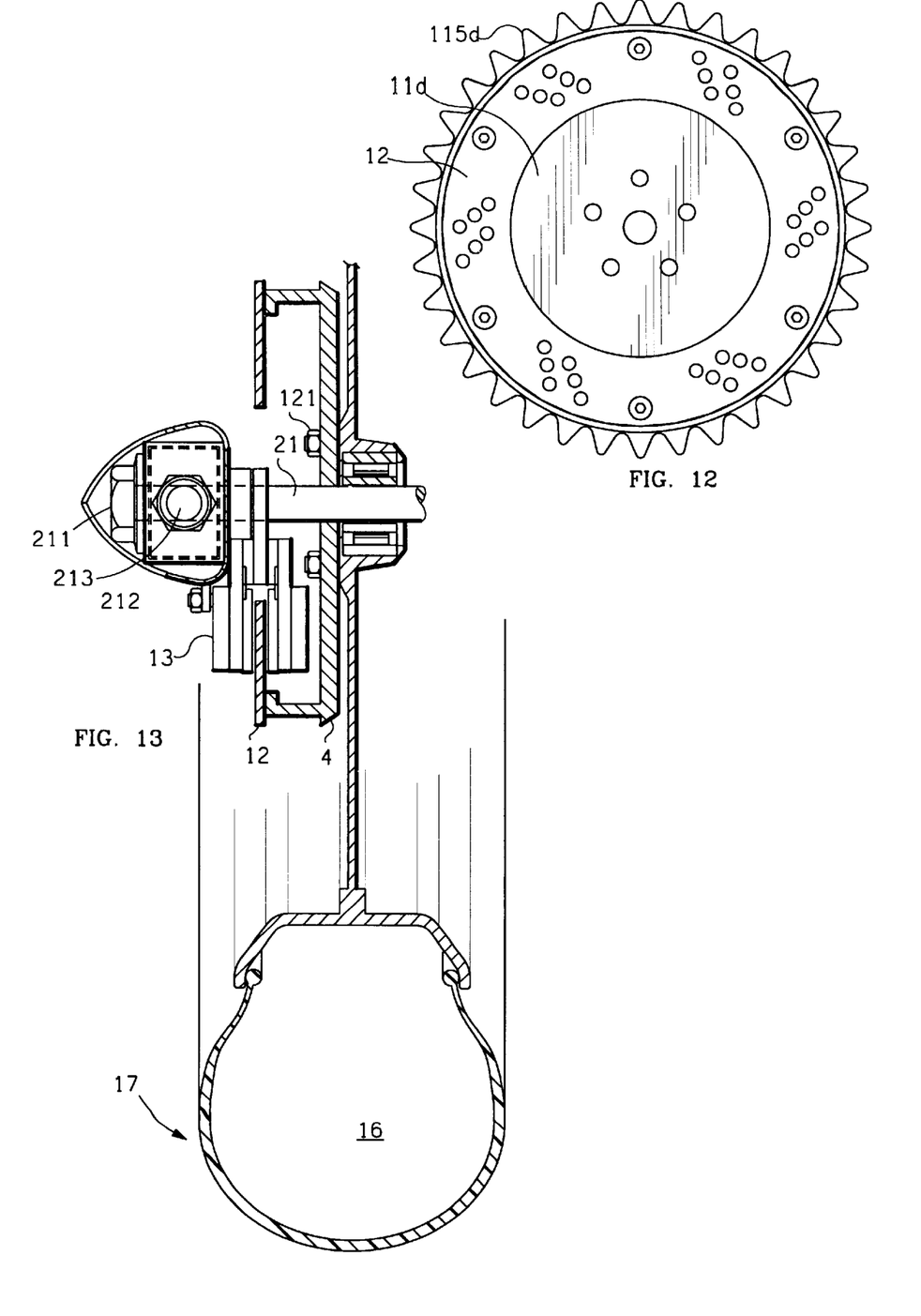
FIG. 12 is a detail side plan view of a fifth variant belt pulley combined with a first variant disk rotor to make the combination brake rotor and belt pulley assembly of the present invention.
FIG. 13 is cut-away rear end view of the combination brake rotor and belt pulley assembly of the present invention as mounted to the rear wheel of a motorcycle as previously seen in perspective view in FIG. 1, the view particularly showing the location of the assembly relative to the motorcycle combination suspension swingarm and light assembly that also serves to cover the axle nut and axle adjustment screws that is the subject of the related patent application.

Note that it is hard to tell from the side view of FIG. 12 whether the sprocket teeth are actually on the belt (chain) pulley 11d or upon the disk rotor 12. It indeed makes no difference on which part of the combined assembly the drive surface for a belt (or, in the case of FIG. 12, a chain) is located.

A cut-away rear end view of the combination brake rotor and belt pulley assembly 10 of the present invention as mounted to the rear wheel of a motorcycle 1 (as was previously seen in perspective view in FIG. 1) is shown in FIG. 13. The belt pulley 11 is mounted to the wheel 16 in position about the axle 21 by bolts (and nuts) 121. The disk rotor 12 is affixed to the belt pulley 11.

Finally, the disk caliper 13 is held in position with the disk rotor 12 passing through its yoke.

The view of FIG. 13 further particularly shows an end view of the motorcycle combination suspension swingarm and light assembly also serving to cover the axle nut and axle adjustment screws that is the subject of the related patent application, the contents of which application are incorporated herein by reference. Basically, a lens cover 31 to the rear end of suspension swingarm 30 serves to cover an axle nut 211, an axle adjusting screw 212, and an axle adjusting plate 213.

In summary, the present invention may now be recognized to preferably be embodied in a rear wheel drive and brake apparatus for a motorcycle having (i) a frame, (ii) a belt or chain drive, (ii) a wheel rotating on (iv) an axle in response to the belt or chain drive, and (v) a suspension swing arm pivotally mounting the axle to the frame.

The apparatus first includes a combination belt pulley and disk brake rotor assembly. This assembly itself includes (i) a belt pulley and (ii) a disk brake rotor.

The (i) belt pulley has a circular plate region suitably affixed to the wheel in position about the axle for rotation concentrically therewith, and a transversely-extending peripheral flange region having a circumferential exterior surface suitably contoured so as to engage the drive belt or chain. These regions cooperating so that the motorcycle wheel affixed to the belt pulley may be rotated upon and about the axle under force of the drive belt or chain. A volume of the belt pulley located within its peripheral flange is at least partially vacant.

The disk brake rotor in the shape of an annular ring. The exterior circumference of the annulus is affixed to the peripheral flange region of the belt pulley.

Finally, the apparatus also, second, includes a disk brake caliper. This caliper has at one end portion an aperture through which passes the shaft, and at another end portion a feature that attaches the suspension swingarm. The rotating disk brake rotor passes though a central yoke of the caliper.

In accordance with the preceding explanation, certain variations and adaptations of the combination brake rotor and belt pulley assembly in accordance with the present invention will suggest themselves to a practitioner of the mechanical design arts.

For example, the concept of the invention is equally applicable to chain drive motorcycles, and where "belt" is spoken of in the present specification and claims then that term includes "chain", and vice versa.

For example, the combination brake rotor and belt pulley assembly of the present invention is not limited to use on motorcycles but may alternatively be used, for example, on motorized bicycles, regular chain-drive bicycles, chain-drive trucks and cars (of a style most popular in the earliest days of motorized vehicles, circa 1895–1915), and treaded tanks and half-tracks. In most four wheel, and treaded, vehicular applications, the advantage of the present invention may be perceived to be more that it is suitable to permit the placement of a disk brake assembly outboard of the wheel, where it may easily be accessed for cleaning and maintenance, than any realization of any aesthetic improvement.

It may even be envisioned that the combination brake rotor and belt pulley assembly of the present invention is applicable to stationary applications, such as the motor chain or belt drive of a rotating load wherein the rotation of the load and/or the motor must occasionally be braked.

It will also be understood that the exterior of the "belt" pulley 11 may be adapted to have either "teeth"—or any other form of conformation of its circumferential surface—so as to suitably engage either belts, including serrated and even "V"-belts, or chains, or any other form of rotary power transmission. Clearly all forms of belts and chains are compatible for use with the combination brake rotor and belt pulley assembly of the present invention. Accordingly, when the words "belt" and "belt pulley" are used in this application, including in the claims, then these terms will be understood to include a "chain", or a "chain pulley".

It will also be understood that, as between the (i) "belt" pulley, and the (ii) brake rotor, elements that are affixed to each other, the (i) "belt" pulley has been taught and shown to be the element which is possessed of the transversely-extending circumferential flange. A practitioner of the mechanical arts will immediately recognize that this transversely-extending circumferential flange could just as well have been part of the disk brake rotor, requiring only a "backing plate" (as the remaining portion of the preferred belt pulley) to attach to the wheel. Next it can be envisioned that the central aperture of said "backing pulley" can grow in size (saving metal and weight) until, until, for wheels or proper contour, it completely disappears, making that the (now) unitary brake rotor with a "belt" pulley exterior circumference is mounted directly to the wheel!

Many considerations are presented in the physical partitionment of the (i) drive and (ii) brake functions of the combination assembly of the present invention: What is the cost of each part's production, and replacement? Will a transverse flange located at the periphery of a ("large hole") brake rotor reduce warping"? Will heat transfer from the disk brake rotor to the drive belt prove adverse? Since, in the shown and described partitionment, the disk brake rotor can be of larger diameter than the belt pulley, what is the cross-compatibility of parts for different motorcycles?

One has only to note the great number of historical alternatives, and patents, regarding the positioning of disk brakes over disk rotors to envision that diverse extensions and adaptations of the "reverse geometry" of the present invention are not only possible but, indeed, to be expected.

Finally, and by way of still further example, any of the numbers and (interior) locations and (angular) orientations of the caliper assembly 13 may be varied without departing from the spirit of the present invention. Likewise, the number and nature of the cylinders and the brake pads within the one or more caliper assemblies may be varied.

In accordance with these and other possible variations and adaptations of the present invention, the scope of the invention should be determined in accordance with the following claims, only, and not solely in accordance with that embodiment within which the invention has been taught.

What is claimed is:

1. In a vehicle having (i) a frame, (ii) a belt or chain drive means, (iii) a wheel rotating on an axle in response to the belt or chain drive means, and (iv) a disk brake caliper, a combination belt pulley and disk brake rotor assembly comprising:

a belt pulley having
      a circular plate region suitably affixed to the wheel in position about the axle for rotation concentrically therewith, and
      a transversely-extending peripheral flange region, engaging the circular plate region, having a circumferential exterior surface suitably contoured so as to engage the drive belt or chain,
      wherein a wheel affixed to the belt pulley may be rotated upon and about the axle under force of the drive belt or chain,
      a volume of the belt pulley within its peripheral flange being at least partially vacant; and
   a disk brake rotor in the shape of an annular ring, the exterior circumference of the annulus being affixed to the peripheral flange region of the belt pulley;
   wherein when the disk brake caliper is mounted between the axle and the frame at least partially within the vacant volume of the belt pulley it will serve to engage the disk brake rotor during braking.

2. The combination belt pulley and disk brake rotor assembly according to claim 1
   wherein the belt pulley's circular plate region has and presents (i) a central aperture, and (ii) circularly-arrayed holes about the central aperture;
   wherein the belt pulley is affixed to the wheel by bolts that pass though the circularly-arrayed holes so as to engage the wheel while the axle passes through the central aperture.

3. The combination belt pulley and disk brake rotor assembly according to claim 1
   wherein the belt pulley's transversely-extending peripheral flange region has and defines at positions on an opposite side to the exterior circumferential surface of this flange region at least an arcuate portion of a plurality of transversely-extending circularly-arrayed holes; and
   wherein the disk brake rotor has and defines in an external circumference of its annulus at least an arcuate portion of a complimentary plurality of bolt holes; and
   a plurality of bolts that pass within the arcuate portions of the pluralities of holes in the belt pulley and in the disk brake rotor to affix the exterior circumference of the annulus of the disk brake rotor to the peripheral flange region of the belt pulley.

4. The combination belt pulley and disk brake rotor assembly according to claim 1
   wherein the circumferential exterior surface contoured so as to engage the drive belt or chain of the transversely-extending peripheral flange region of the belt pulley has and presents serrations suitable to engage a toothed drive belt.

5. The combination belt pulley and disk brake rotor assembly according to claim 1
   wherein the circumferential exterior surface contoured so as to engage the drive belt or chain of the transversely-extending peripheral flange region of the belt pulley has and presents sprockets suitable to engage a drive chain.

6. A belt pulley for use with a motorcycle having a rear wheel rotating on an axle in response to a drive belt or a drive chain, and having a rear disk brake rotor in the shape of an annular ring and a disk brake caliper, the belt pulley comprising:

a body in the shape of a thick annular ring with
   a circumferential flange extending transversely substantially to one side of the annular ring, with
   an exterior surface to the transversely-extending circumferential flange which surface is suitably contoured so as to engage the drive belt or the drive chain,
   wherein the axle passes through a central aperture of the annulus while the drive belt or the drive chain engages the outer surface of the circumferential flange;

first mounting means for affixing the rear wheel to the body's thick annular ring with the body's transverse circumferential flange extending oppositely to the wheel, wherein a rotation of the body by the drive belt of the drive chain also serves to co-rotate the wheel; and second mounting means, located near the circumferential flange of the body in a position not interfering with the engagement of the drive belt or the drive chain by the outer surface of this flange, for affixing the body at and to an outer circumferential portion of the annular rotor whereupon a remaining, interior, portion of the rotor extends substantially spaced parallel to the body's annular ring;

wherein the disk brake caliper suitably positioned and oriented can engage the interior portion of the rotor.

7. The belt pulley for use with a motorcycle according to claim 6
   wherein the body has circularly arrayed holes about its central aperture;
   and wherein the first mounting means comprises:
      bolts that pass though the circularly-arrayed holes so as to engage the wheel.

8. The belt pulley for use with a motorcycle according to claim 6
   wherein the body has circularly arrayed holes interior to its circumferential flange;
   and wherein the second mounting means comprises:
      bolts that pass though the circularly-arrayed holes so as to engage the brake rotor.

9. The belt pulley for a motorcycle according to claim 6
   wherein the exterior surface to the transversely-extending circumferential flange contoured so as to engage the drive belt or chain has and presents serrations suitable to engage a drive belt.

10. The belt pulley for a motorcycle according to claim 6
    wherein the exterior surface to the transversely extending circumferential flange contoured so as to engage the drive belt or chain has and presents sprockets suitable to engage a drive chain.

11. A combination disk brake rotor and belt pulley for a motorcycle also having (i) a frame, (ii) a wheel rotating relative to the frame, and (iii) a disk brake caliper that is affixed to the frame and activated during braking, the combination disk brake rotor and belt pulley comprising:

a disk brake rotor having a body in the shape of an annular ring
   with a peripheral circumferential region of the annulus having and presenting features that are suitable to stably affix an external structure for imparting rotation to the body, while
   an interior region to the annulus that is pressured against the disk brake caliper during braking so as to retard rotation of the body relative to the frame;
   wherein the disk brake rotor is distinguished in that its annular body is engaged and affixed for rotation at its peripheral region while its annular body is pressured against the disk brake caliper at its interior region to retard rotation during braking; and a belt pulley affixed to both (i) the peripheral circumferential region of the annulus of the disk brake rotor body by action of the features present at this region, and, also, (ii) to the wheel of the motorcycle for co-rotation therewith.

12. The motorcycle combination disk brake rotor and belt pulley according to claim 11 wherein disk rotor's annulus body's peripheral region's affixation features comprise:
    particularly arrayed bolt holes in, and defined by, the body at its annular peripheral region.

13. A rear wheel drive and brake apparatus for a motorcycle having (i) a frame, (ii) a belt or chain drive, (ii) a wheel rotating on (iv) an axle in response to the belt or chain drive, and (v) a suspension swing arm pivotally mounting the axle to the frame, the drive-and-brake apparatus comprising:
    1) a combination belt pulley and disk brake rotor assembly including
       1.1) a belt pulley having
          1.1.1) a circular plate region suitably affixed to the wheel in position about the axle for rotation concentrically therewith, and
          1.1.2) a transversely-extending peripheral flange region having a circumferential exterior surface suitably contoured so as to engage the drive belt or chain,
       wherein a wheel affixed to the belt pulley may be rotated upon and about the axle under force of the drive belt or chain,
          a volume of the belt pulley within its peripheral flange being at least partially vacant, and
       1.2) a disk brake rotor in the shape of an annular ring, the exterior circumference of the annulus being affixed to the peripheral flange region of the belt pulley; and
    2) a disk brake caliper having and defining (i) at a one end portion an aperture through which passes the axle, and (ii) at another end portion a feature that attaches the suspension swingarm, and (iii) a central yoke through which passes the rotating disk brake rotor.

14. For use with a vehicle having (i) a frame, (ii) a belt or chain drive means, (iii) a wheel rotating on an axle in response to the belt or chain drive means, and (iv) a disk brake caliper mounted to the frame, a combination belt pulley and disk brake rotor assembly comprising:
    a belt pulley means, (1) having an exterior circumferential surface engaging the belt or chain drive means and (2) affixed to the wheel for rotation therewith, for, in response to force communicated by the belt or chain drive means, inducing rotation of the wheel, the belt pulley means having and defining within at least a portion of its interior a hollow volume; and
    a disk brake rotor in the shape of an annular ring located at least partially within the hollow volume of the belt pulley means, the rotor affixed at an exterior region of its annulus to the belt pulley means for rotation therewith while engaging at an interior region of its annulus the disk brake caliper;

wherein pressured engagement of the brake caliper to the disk brake rotor during braking of the vehicle retards rotation of the wheel relative to the frame.

15. For use with a vehicle having (i) a frame, (ii) a belt drive, (iii) a wheel rotating on an axle in response to the belt drive, and (iv) a disk brake caliper mounted to the frame, a combination belt pulley and disk brake rotor assembly comprising:

a belt pulley having
  a central plate region affixed to the wheel about the axle for rotation with the wheel,
  a hollow interior circular pulley engaging the belt drive, and
  means for connecting the central plate region to an interior of the circular pulley,
  the belt pulley having and defining a void in at least a portion of the region interior to its circular pulley nonetheless to the means for connecting; and
a disk brake rotor in the shape of an annular ring located at least partially within the void of the belt pulley; and
means for affixing an exterior annular region of the brake rotor to the belt pulley for rotation therewith;
wherein the mounting of the disk brake caliper to the frame permits the caliper to engage and pressure against the annular rotor at an interior region of its annulus during breaking of the vehicle, retarding rotation of the wheel relative to the frame.

16. The combination belt pulley and disk brake rotor assembly according to claim 15 wherein the means for connecting comprises:

spokes.

17. The combination belt pulley and disk brake rotor assembly according to claim 15 wherein the means for affixing comprises:

bolts.

18. The combination belt pulley and disk brake rotor assembly to claim 17 wherein the belt pulley defines and presents, radially inwards towards its interior void, areas relieved in a semi-circle so as to form an arcuate portion of a bolt hole;

wherein the disk brake rotor presents, radially outwards from its exterior annulus, areas, complimentary in numbers and in position and in size to the relieved areas of the belt pulley, areas relieved to the semi-circle of a bolt hole, wherein the bolts fit between the semi-circles of the belt pulley and the complimentary semi-circles of the brake rotor, affixing the brake rotor to the belt pulley for rotation therewith.

* * * * *